United States Patent
Suwa

(10) Patent No.: US 10,542,200 B2
(45) Date of Patent: Jan. 21, 2020

(54) SURVEILLANCE CAMERA SYSTEM

(71) Applicant: Panasonic Intellectual Property Management Co., Ltd., Osaka (JP)

(72) Inventor: Yutaka Suwa, Fukuoka (JP)

(73) Assignee: PANASONIC INTELLECTUAL PROPERTY MANAGEMANT CO., LTD., Osaka (JP)

( * ) Notice: Subject to any disclaimer, the term of this patent is extended or adjusted under 35 U.S.C. 154(b) by 27 days.

(21) Appl. No.: 15/894,665

(22) Filed: Feb. 12, 2018

(65) Prior Publication Data
US 2018/0343379 A1 Nov. 29, 2018

(30) Foreign Application Priority Data

May 23, 2017 (JP) ................................ 2017-101941
May 23, 2017 (JP) ................................ 2017-101951

(51) Int. Cl.
*H04N 5/232* (2006.01)
*H04N 7/18* (2006.01)
*H04W 84/12* (2009.01)

(52) U.S. Cl.
CPC ......... *H04N 5/23206* (2013.01); *H04N 7/183* (2013.01); *H04W 84/12* (2013.01)

(58) Field of Classification Search
CPC ... H04N 7/00; H04N 5/00; G06K 9/00; G06T 7/00; G08B 13/00; H04W 36/00
See application file for complete search history.

(56) References Cited

U.S. PATENT DOCUMENTS

| 6,070,195 A | 5/2000 | Yamamoto |
| 2006/0209176 A1 | 9/2006 | Nakamura et al. |
| 2008/0122949 A1* | 5/2008 | Kindborg .......... G08B 13/19671 348/231.99 |
| 2008/0125176 A1* | 5/2008 | Kojima ................ H04B 7/0857 455/561 |
| 2010/0246496 A1* | 9/2010 | Yurugi ................ H04B 7/0851 370/328 |
| 2010/0316034 A1* | 12/2010 | Burbidge .......... H04W 36/0022 370/338 |
| 2011/0055363 A1 | 3/2011 | Kanno et al. |
| 2016/0219433 A1 | 7/2016 | Naruse |

FOREIGN PATENT DOCUMENTS

| JP | 10-215342 A | 8/1998 |
| JP | 2000-278325 A | 10/2000 |
| JP | 2007-179555 A | 7/2007 |
| JP | 2010-193161 A | 9/2010 |
| JP | 2010-278973 A | 12/2010 |
| JP | 2011-055124 A | 3/2011 |
| JP | 2016-136704 A | 7/2016 |
| JP | 2007-323533 A | 12/2017 |

* cited by examiner

*Primary Examiner* — Clifford Hilaire
(74) *Attorney, Agent, or Firm* — Seed IP Law Group LLP

(57) ABSTRACT

A camera transmits a DECT registration request including DECT camera information. A controller stores the DECT camera information and transmits a DECT registration response including DECT controller information. The camera stores the DECT controller information and transmits a wireless LAN registration request including wireless LAN camera information. The controller stores the wireless LAN camera information and transmits a wireless LAN registration response including wireless LAN controller information. The camera stores the wireless LAN controller information.

6 Claims, 11 Drawing Sheets

FIG. 11A

WIRELESS LAN (2.4 G/5 G) WEIGHT Table

| WEIGHT | | | | | | | | | | |
|---|---|---|---|---|---|---|---|---|---|---|
| 10 | | | | | | | | | | |
| 9 | | | | | | | | | | |
| 8 | | | | | | | | | | |
| 7 | | | | | | | | | | |
| 6 | | | | | | | | | | |
| 5 | | | | | | | | | | |
| 4 | | | | | | | | | | |
| 3 | | | | | | | | | | |
| 2 | | | | | | | | | | |
| 1 | | | | | | | | | | |
| | −4 | −3 | −2 | −1 | SAME | +1 | +2 | +3 | +4 | |

CHANNEL (FOR COMMUNICATION CHANNEL)

FIG. 11B

DECT WEIGHT Table

| WEIGHT | | | | | | | | | | |
|---|---|---|---|---|---|---|---|---|---|---|
| 10 | | | | | | | | | | |
| 9 | | | | | | | | | | |
| 8 | | | | | | | | | | |
| 7 | | | | | | | | | | |
| 6 | | | | | | | | | | |
| 5 | | | | | | | | | | |
| 4 | | | | | | | | | | |
| 3 | | | | | | | | | | |
| 2 | | | | | | | | | | |
| 1 | | | | | | | | | | |
| | −4 | −3 | −2 | −1 | SAME | +1 | +2 | +3 | +4 | |

CHANNEL (FOR COMMUNICATION CHANNEL)

SURVEILLANCE CAMERA SYSTEM

BACKGROUND

1. Technical Field

The present invention relates to a surveillance camera system that inputs and outputs data with a camera.

2. Description of the Related Art

A surveillance camera system that monitors intruders who have entered the premises in a house is known. For example, the surveillance camera system is described in Japanese Patent Unexamined Publication No. 2007-323533. In addition, a surveillance camera system in which a camera and a controller perform wireless communication has also been devised.

However, there has not been disclosed a surveillance camera system that allows a camera and a controller to perform wireless communication using any one of a plurality of communication methods.

SUMMARY

In view of the above circumstances, an object of the present disclosure is to provide a surveillance camera system that allows a camera and a controller performing wireless communication by using any one of a plurality of communication methods having different bandwidths to easily set and register all communication methods. A surveillance camera system according to an aspect of the present disclosure includes a surveillance camera that performs imaging and generates image data and a controller that receives and displays image data from the surveillance camera and controls the surveillance camera, in which the surveillance camera and the controller perform wireless communication by any one of a plurality of communication methods having different bandwidths, the controller performs registration processing of the surveillance camera using a first communication method, and in the registration processing, exchange of first information for connection by the first communication method and second information for connection by a second communication method is performed with the surveillance camera. In addition, a surveillance camera system according to another aspect of the present disclosure includes according to another aspect of the present disclosure includes a surveillance camera that performs imaging and generates image data and a controller that receives and displays image data from the surveillance camera and controls the surveillance camera, in which the surveillance camera and the controller perform wireless communication by any one of a plurality of communication methods having different bandwidths, the surveillance camera measures environmental values indicating an environment of a bandwidth of each communication method, determines a communication method to be used for communication with the controller based on each of the environmental values, and transmits image data to the controller according to the determined communication method.

According to the present disclosure, a camera and a controller that perform wireless communication using any one of a plurality of communication methods having different bandwidths may easily perform setting registration for all communication methods. In addition, according to the present disclosure, it is possible to easily select an optimum communication method from a plurality of communication methods having different bandwidths.

BRIEF DESCRIPTION OF THE DRAWINGS

FIG. 11A is a diagram showing an example of a weight table used for camera weight calculation in a wireless LAN according to the exemplary embodiment of the present disclosure; and FIG. 11B is a diagram showing an example of the weight table used for camera weight calculation in DECT according to the exemplary embodiment of the present disclosure.

DETAILED DESCRIPTION

Hereinafter, an exemplary embodiment of the present disclosure will be described in detail with reference to drawings as appropriate. However, detailed explanation may be omitted more than necessary. For example, there are cases where a detailed description of well-known matters and redundant description on substantially the same configuration may be omitted. This is for avoiding unnecessary redundancy of the following description and facilitating understanding by those skilled in the art.

The accompanying drawings and the following description are provided to enable those skilled in the art to fully understand the present disclosure and are not intended to limit the claimed subject matters.

System Configuration

Figure 1:
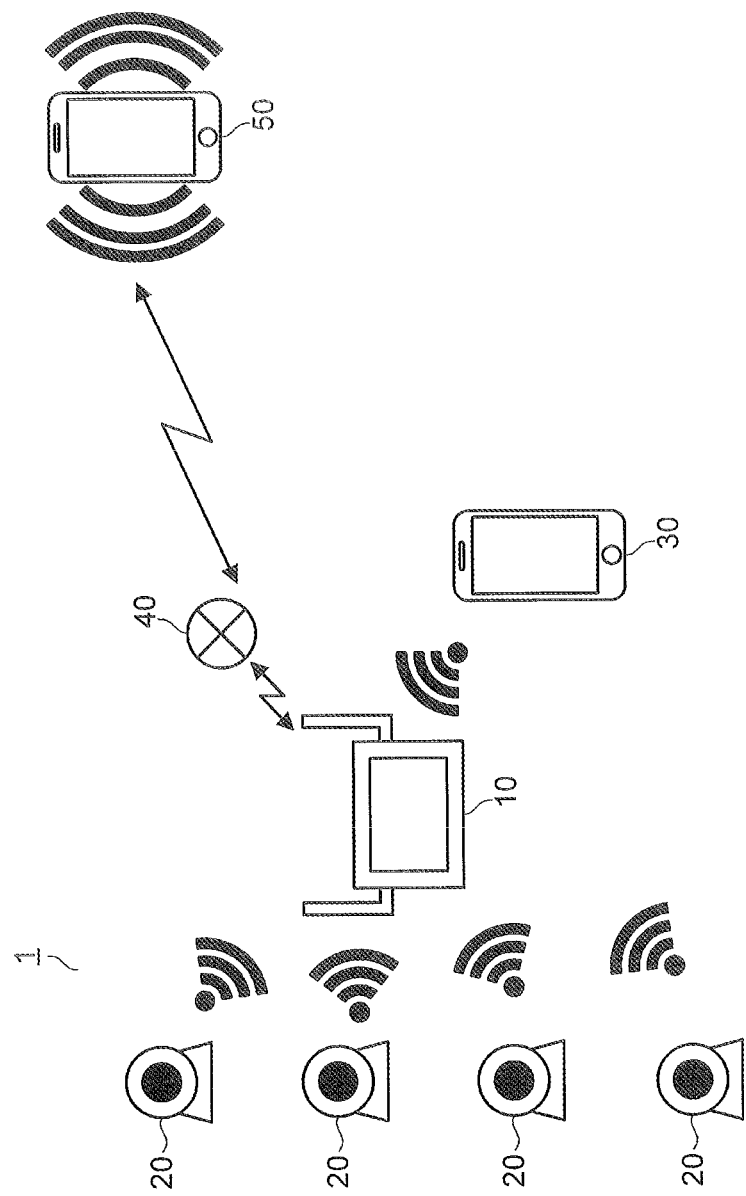
FIG. 1 is a diagram showing a system configuration of a surveillance camera system according to an exemplary embodiment of the present disclosure.

FIG. 1 is a diagram showing a system configuration of surveillance camera system 1 according to a first exemplary embodiment. Surveillance camera system 1 is mainly installed in a house and consists of one controller 10 and one or a plurality of cameras 20.

Controller 10 performs processing for registering each camera 20 at the timing of receiving a connection request from each camera 20. Details of the registration processing of camera 20 by controller 10 will be described later.

Controller 10 performs wireless communication with each of registered cameras 20 using one of the communication methods (1) a method conforming to a wireless local area network (LAN) standard using a 5 GHz bandwidth (hereinafter, referred to as "5 G wireless LAN method"), (2) a method conforming to the wireless LAN standard using a 2.4 GHz bandwidth (hereinafter, referred to as "2.4 G wireless LAN method"), and (3) a method conforming to the digital enhanced cordless telecommunications (DECT) standard using a 1.9 GHz bandwidth (hereinafter, referred to as "DECT method"). Wireless LAN has higher throughput than DECT, and may transmit and receive a lot of data per unit time. However, DECT has higher interference resistance than wireless LAN. In addition, in the wireless LAN, using the 5 GHz bandwidth has higher throughput than using the 2.4 GHz band, and it is possible to transmit and receive a lot of data per unit time. However, using the 2.4 GHz bandwidth has better interference resistance than using the 5 GHz band.

Then, controller 10 receives image data from each camera 20 and displays the image data on a screen. At this time, controller 10 displays the image data received using the 5 G wireless LAN method in a screen mode of full high definition (HD) (resolution 1920×1080 pixels). In addition, controller 10 displays the image data received using the 2.4 G wireless LAN method in a screen mode of HD (resolution 1280×720 pixels). In addition, controller 10 displays the image data received using the DECT method in a screen mode of video graphics array (VGA) (resolution 640×480 pixels).

In addition, controller 10 transmits control data to each of cameras 20 and controls operations (data rate, pan, tilt, light, shutter, filter, and other operations of the cameras) of each camera 20 or the operations of various sensor devices included in each camera 20. Controller 10 has a call function (microphone and speaker) and may transmit and receive audio data to and from each camera 20.

In addition, controller 10 may perform wireless communication with in-home smartphone 30 (portable terminal) by using a wireless LAN. In addition, controller 10 may perform wireless communication with outside smartphone 50 (portable terminal) connected to public network 40 such as the Internet.

Each camera 20 captures an image by using a predetermined condition as a trigger and transmits image data to controller 10 by using any one communication method of the 5 G wireless LAN method, the 2.4 G wireless LAN method, and the DECT method. Each camera 20 has a call function (microphone and speaker) and may transmit and receive audio data to and from controller 10. In addition, each of cameras 20 may be a part of another device such as an entrance slave device of a door phone or a doorbell.

Smartphones 30 and 50 may receive the image data captured by cameras 20 via controller 10 and display the data on a screen. In addition, smartphones 30 and 50 may control the operations of each camera 20 via controller 10.

Internal Configuration of Controller

Figure 2:
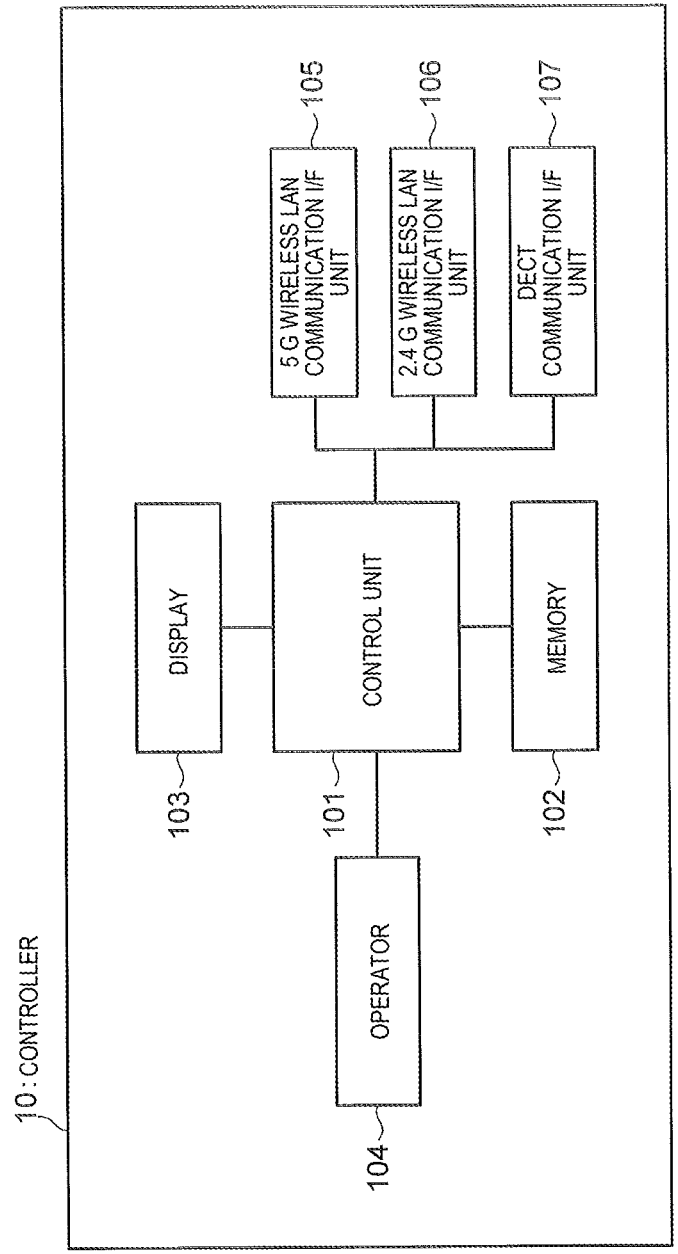
FIG. 2 is a block diagram showing an internal configuration of a controller according to the exemplary embodiment of the present disclosure.

FIG. 2 is a block diagram showing the internal configuration of controller 10. Controller 10 includes control unit 101, memory 102, display 103, operator 104, 5 G wireless LAN communication I/F unit 105, 2.4 G wireless LAN communication I/F unit 106, DECT communication I/F unit 107. In FIG. 2, illustration of the interface (I/F) portion for communication with smartphones 30 and 50 is omitted.

Control unit 101 receives an instruction of a user by an input operation of operator 104 of the user and controls each unit in controller 10 and each camera 20 based on the instruction of the user.

In addition, control unit 101 performs registration processing on camera 20 for which a connection request has been made and stores various types of information on each of registered cameras 20 in memory 102.

In addition, control unit 101 inputs the image data captured by each camera 20 from an interface unit (any one of 5 G wireless LAN communication I/F unit 105, 2.4 G wireless LAN communication I/F unit 106, and DECT communication I/F unit 107) corresponding to the communication bandwidth selected by camera 20. Control unit 101 displays the input image data on display 103 and stores the image data in memory 102.

5 G wireless LAN communication I/F unit 105 performs wireless communication with camera 20 by using the 5 G wireless LAN method. 2.4 G wireless LAN communication I/F unit 106 performs wireless communication with camera 20 by using the 2.4 G wireless LAN method. DECT communication I/F unit 107 performs wireless communication with camera 20 by using the DECT method.

Internal Configuration of Camera

Figure 3:
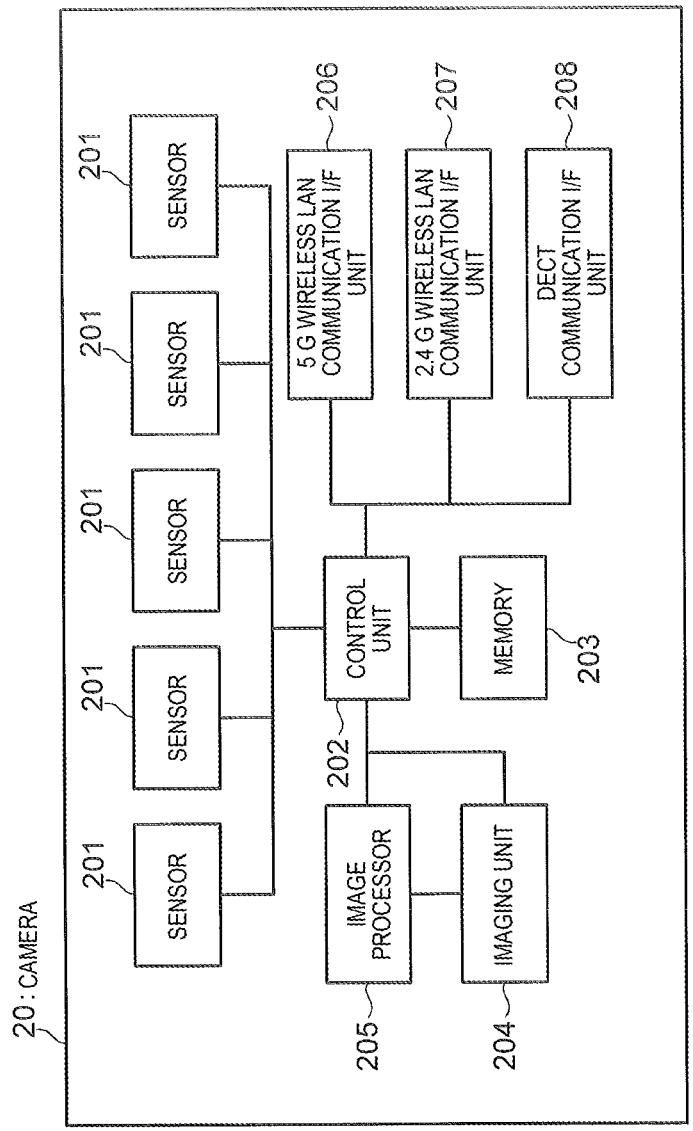
FIG. 3 is a block diagram showing an internal configuration of a camera according to the exemplary embodiment of the present disclosure.

FIG. 3 is a block diagram showing the internal configuration of camera 20. Camera 20 includes sensor 201, control unit 202, memory 203, imaging unit 204, image processor 205, 5 G wireless LAN communication I/F unit 206, 2.4 G wireless LAN communication I/F unit 207, DECT communication I/F unit 208. Camera 20 may include a plurality of sensors 201.

Sensor 201 is a human sensor that senses changes in temperature, sound, movement, infrared ray, ultrasonic wave, visible light, illuminance, and the like to detect the location of a person (a person has entered the premises in a house). Sensor 201 outputs a detection signal indicating that the location of the person has been detected to control unit 202.

Control unit 202 controls each unit in camera 20 based on a control signal input from controller 10.

In addition, in a case of receiving an imaging start instruction from controller 10 or inputting a detection signal from sensor 201, control unit 202 instructs imaging unit 204 to start imaging.

In addition, control unit 202 measures numerical values (hereinafter, referred to as "environmental values") indicating the environment of each bandwidth and determines a communication method to be used for transmitting the image data based on the environmental values. Control unit 202 causes the interface unit (5 G wireless LAN communication I/F unit 206, 2.4 G wireless LAN communication I/F unit 207, and DECT communication I/F unit 208) corresponding to the determined communication method (band) to transmit the image data obtained by image processor 205. The processing flow from the selection of a communication bandwidth to the transmission of image data by camera 20 (control unit 202) will be described later.

Memory 203 stores various types of information of camera 20.

Imaging unit 204 includes a lens, an imaging element (for example, an image sensor such as a charged coupled device (CCD), or a complementary metal oxide semiconductor (CMOS)). Imaging unit 204 performs imaging according to an instruction of control unit 202 and outputs a captured frame image to image processor 205.

Image processor 205 performs A/D conversion processing on the frame image output from imaging unit 204 and further performs various image processing such as white balance processing or y processing to obtain image data.

5 G wireless LAN communication I/F unit 206 performs wireless communication with controller 10 by using the 5 G wireless LAN method. 2.4 G wireless LAN communication I/F unit 207 performs wireless communication with controller 10 by using the 2.4 G wireless LAN method. DECT communication I/F unit 208 performs wireless communication with controller 10 by using the DECT method.

Registration Processing

Figure 4:
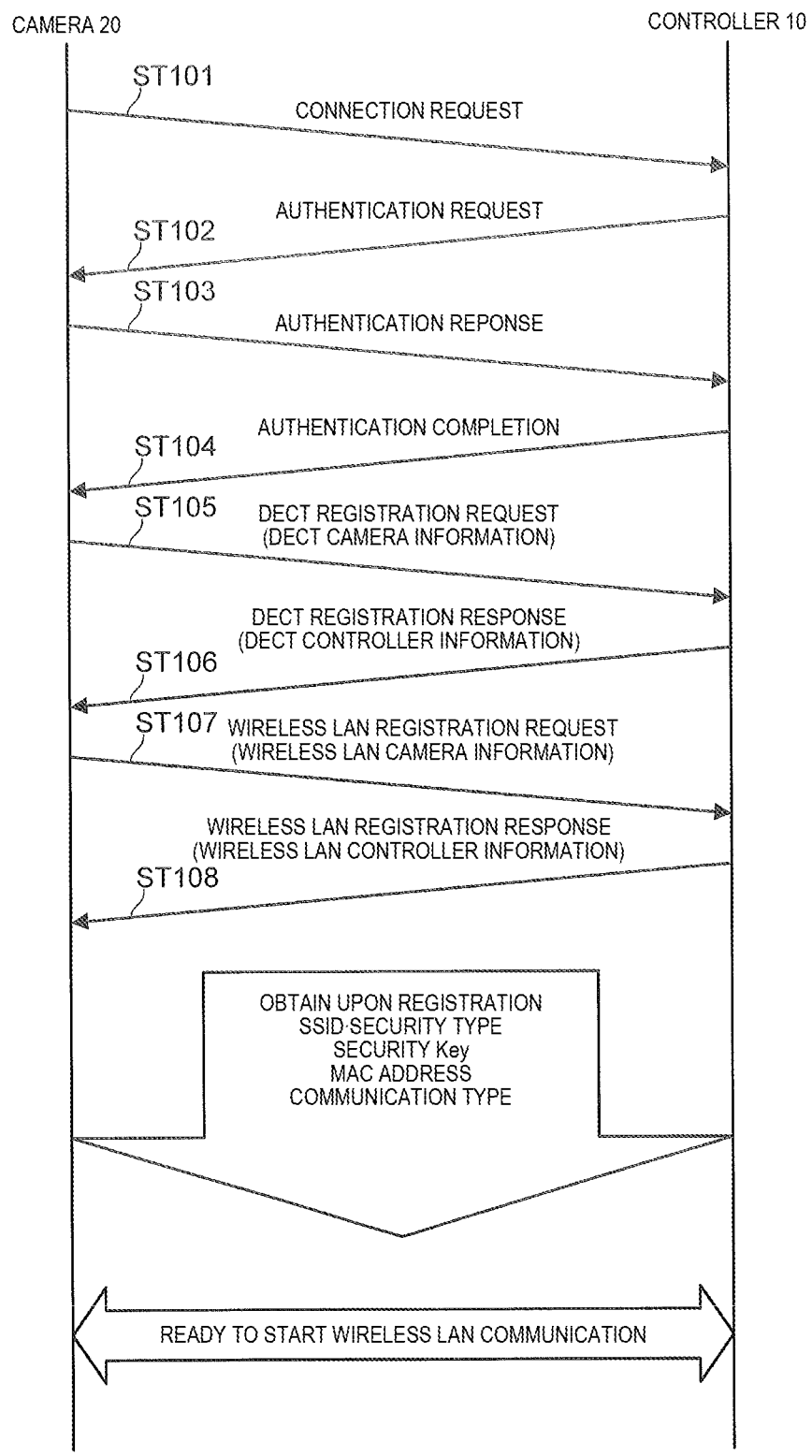
FIG. 4 is a sequence diagram showing a flow of camera registration processing by the controller according to the exemplary embodiment of the present disclosure.

Next, the registration processing of camera 20 by controller 10 will be described in detail with reference to FIG. 4. It is assumed that 5 G wireless LAN communication I/F unit 105, 2.4 G wireless LAN communication I/F unit 106, and DECT communication I/F unit 107 of controller 10 are activated as the premise of the registration processing.

First, after camera 20 is powered on, camera 20 activates DECT communication I/F unit 208 and transmits a connection request including an ID of camera 20 (hereinafter, referred to as "camera ID") to controller 10 (ST 101). When receiving a connection request, controller 10 stores the camera ID and transmits an authentication request including the camera ID and an ID of controller 10 (hereinafter, referred to as "controller ID") to camera 20 (ST 102).

When receiving the authentication request, camera 20 stores the controller ID and transmits an authentication response including the camera ID and the controller ID to controller 10 (ST 103). When receiving the authentication response, controller 10 performs authentication processing, and when the authentication succeeds, controller 10 transmits an authentication completion including the camera ID and the controller ID to camera 20 (ST 104).

When receiving the authentication completion, camera 20 transmits a DECT registration request including DECT camera information, which is information necessary for DECT communication with camera 20, to controller 10 (ST 105). When receiving the DECT registration request, controller 10 stores the DECT camera information and transmits a DECT registration response including the DECT controller information, which is information necessary for the DECT communication with controller 10, to camera 20 (ST 106).

When receiving the DECT registration response, camera 20 stores DECT controller information and transmits a wireless LAN registration request including wireless LAN camera information, which is information necessary for wireless LAN communication with camera 20, to controller 10 (ST 107). Upon receiving the wireless LAN registration request, controller 10 stores wireless LAN camera information and transmits a wireless LAN registration response including wireless LAN controller information, which is information necessary for wireless LAN communication with controller 10, to camera 20 (ST 108). When receiving the wireless LAN registration response, camera 20 stores the wireless LAN controller information.

As a result, information necessary for DECT communication and information necessary for wireless LAN communication may be exchanged between controller 10 and camera 20. The information necessary for wireless LAN communication includes SSID security type, security key, MAC address, communication type, and the like.

By the steps of ST 101 to ST 108, registration processing of camera 20 by controller 10 is completed. As a result, the wireless LAN communication may be started between controller 10 and camera 20.

As described above, according to the present exemplary embodiment, in a relatively simple DECT registration processing, information necessary for wireless LAN communication may be exchanged and wireless LAN setting registration may also be performed.

State Transition

Figure 5:
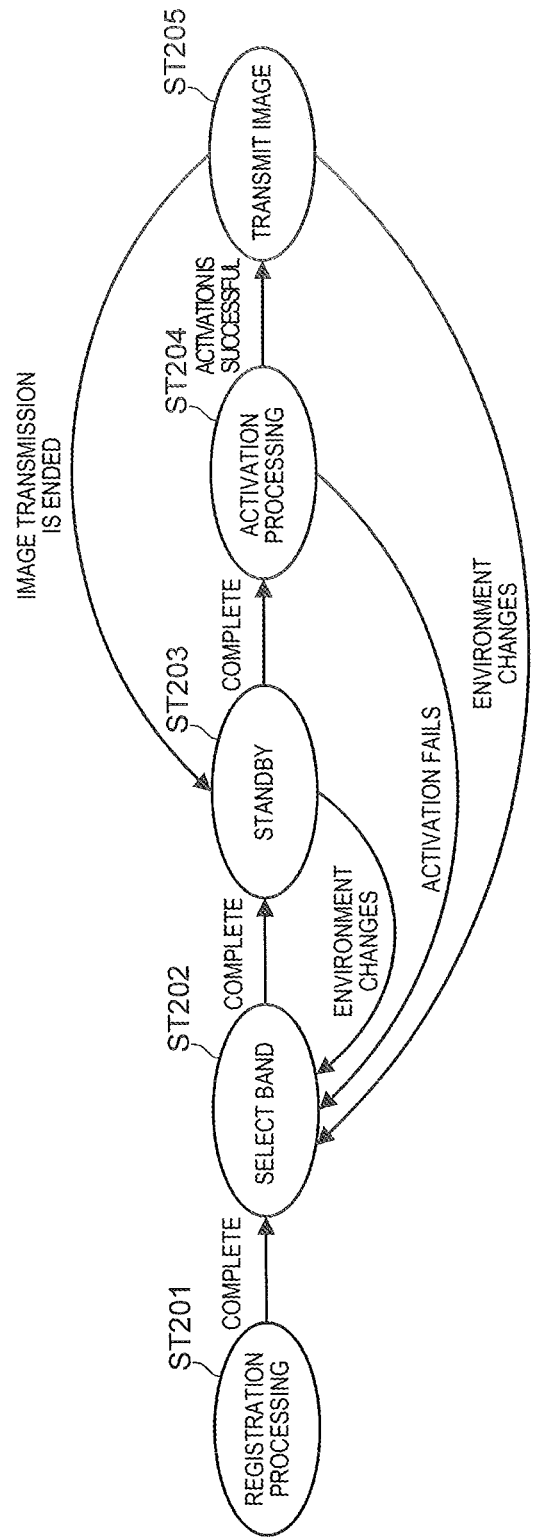
FIG. 5 is a diagram showing a state transition of the camera according to the exemplary embodiment of the present disclosure.

Next, the state transition from the completion of the registration processing of camera 20 to image transmission will be described with reference to FIG. 5.

Camera 20 performs the "registration processing" described above with controller 10 (ST 201), and when "registration processing" is completed, camera 20 transitions to "bandwidth selection" for selecting a bandwidth used for communication with controller 10 (ST 202). A specific processing flow in the "bandwidth selection" of camera 20 will be described later.

When "bandwidth selection" is completed, camera 20 transitions to "standby" preparing for communication with controller 10 (ST 203). Camera 20 measures environmental values in a "standby" state and transitions to "bandwidth selection" when the environment changes (ST 202). A specific processing flow in "standby" of camera 20 will be described later.

When "standby" is completed, camera 20 transitions to "activation processing" for performing communication establishment with controller 10 (ST 204). In a case where communication with controller 10 may not be established in the "activation processing" and the "activation processing" fails, camera 20 transitions to "bandwidth selection" (ST 202).

When the "activation processing" is successful and communication with controller 10 is established, camera 20 transitions to "image transmission" for transmitting image data to controller 10 (ST 205). When "image transmission" is completed, camera 20 transitions to "standby" (ST 203). In addition, camera 20 measures environmental values in "image transmission" state and transitions to "bandwidth selection" when the environment changes (ST 202). A specific processing flow in "image transmission" of camera 20 will be described later.

Bandwidth Selection

Figure 6:
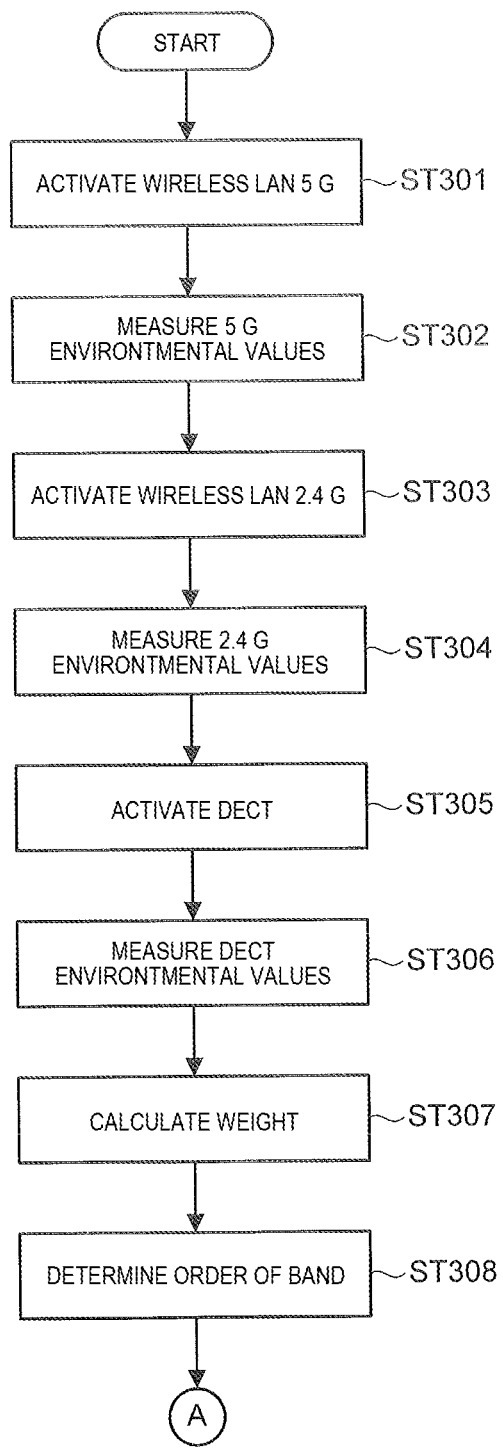
FIG. 6 is a diagram showing a processing flow in a state of bandwidth selection of the camera according to the exemplary embodiment of the present disclosure.
Figure 7:
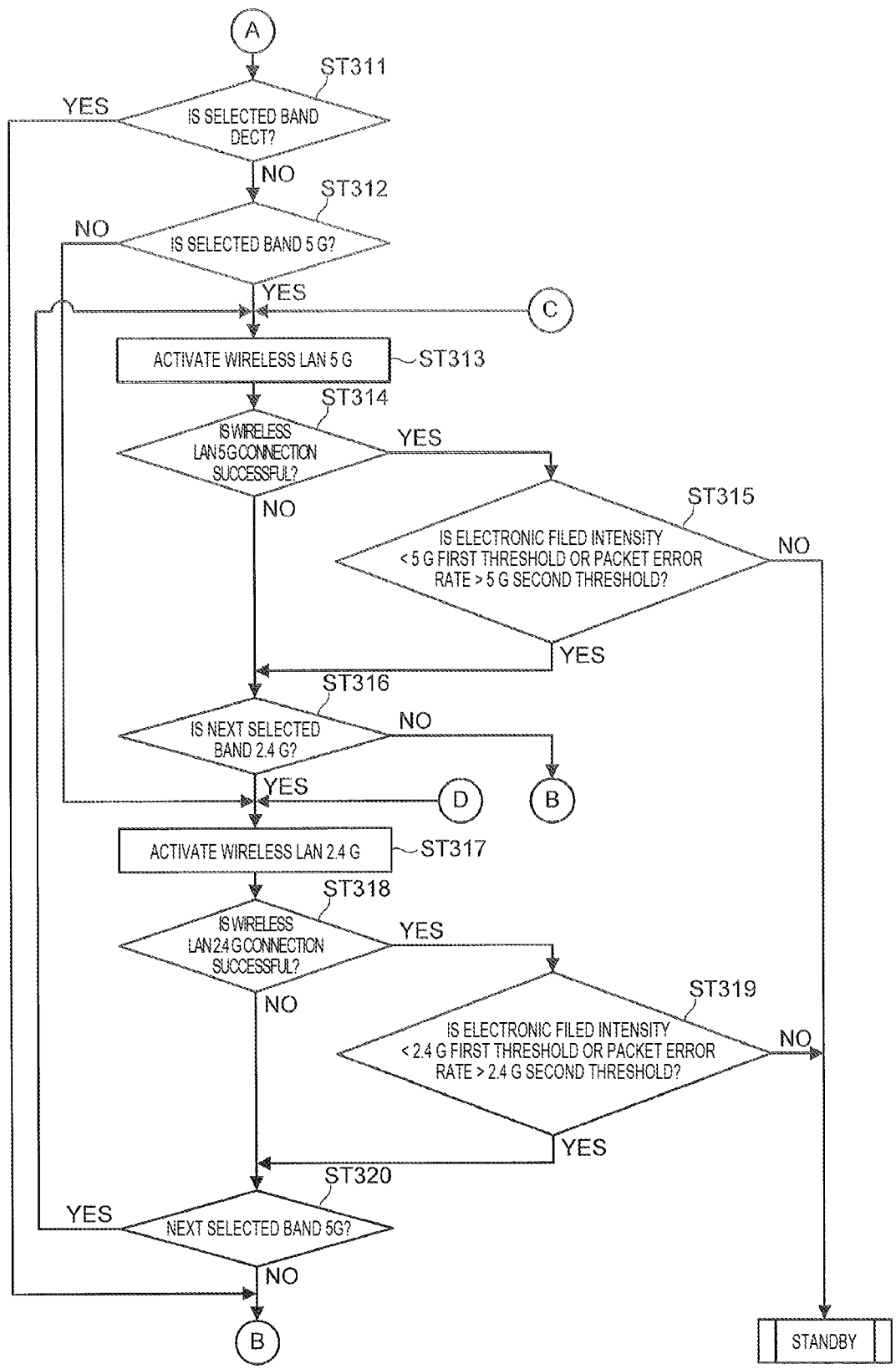
FIG. 7 is a diagram showing a processing flow in a state of bandwidth selection of the camera according to the exemplary embodiment of the present disclosure.
Figure 8:
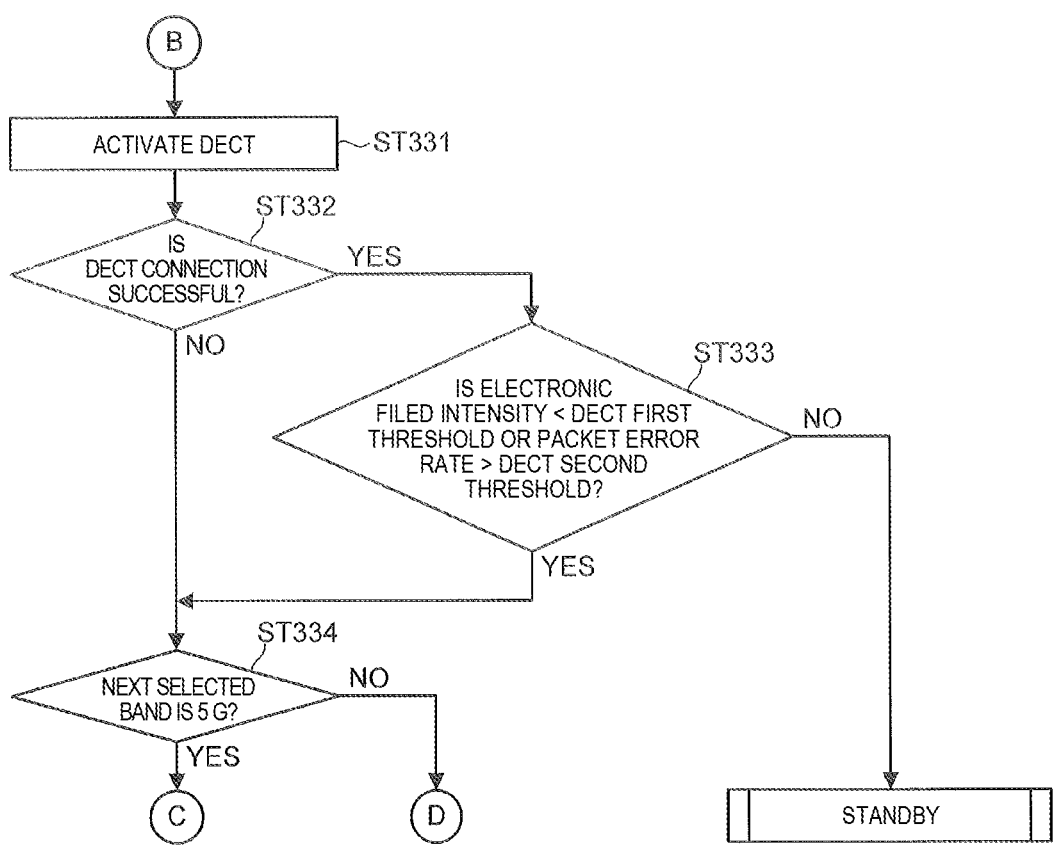
FIG. 8 is a diagram showing a processing flow in a state of bandwidth selection of the camera according to the exemplary embodiment of the present disclosure.

Next, a processing flow in the bandwidth selection state of camera 20 will be described with reference to FIGS. 6, 7, and 8.

After the registration processing, in the "bandwidth selection" state, camera 20 activates 5 G wireless LAN communication I/F unit 206 and enable wireless LAN communication using the 5 GHz bandwidth (ST 301) to measure environmental values in the 5 GHz bandwidth (in this example, packet error rate, electric field intensity (received signal strength indicator (RSSI)) (ST 302).

Next, camera 20 activates 2.4 G wireless LAN communication I/F unit 207 and enable wireless LAN communication using the 2.4 GHz bandwidth (ST 303) to measure environmental values in the 2.4 GHz bandwidth (ST 304).

Next, camera 20 activates DECT communication I/F unit 208 and enables the DECT communication using the 1.9 GHz bandwidth (ST 305) to measure environmental values in the 1.9 GHz bandwidth (ST 306).

Next, camera 20 performs weight calculation for each bandwidth and calculates the weight sum of each bandwidth (ST 307). A specific example of the weight calculation will be described later.

Next, camera 20 determines the order of the bandwidth to be selected based on the weight sum of each bandwidth (ST 308). More specifically, camera 20 selects a bandwidth in descending order of weight sum.

In a case where the bandwidth selected first by camera 20 in ST 308 is the 5 GHz bandwidth (ST 311: NO, ST 312: YES), the flow proceeds to ST 313. In addition, in a case where the bandwidth selected first by camera 20 is 2.4 GHz bandwidth (ST 311: NO, ST 312: NO), the flow proceeds to ST 317. In addition, in a case where the bandwidth selected first by camera 20 is 1.9 GHz bandwidth (ST 311: YES), the flow proceeds to ST 331.

In ST 313, camera 20 activates 5 G wireless LAN communication I/F unit 206 so as to enable wireless LAN communication using the 5 GHz band.

Then, in a case where the wireless LAN connection in the 5 GHz bandwidth is successful (ST 314: YES) and the electric field intensity is equal to or higher than a threshold (hereinafter, referred to as "5 G first threshold") necessary for communication in the 5 GHz bandwidth and the packet error rate is smaller than a threshold (hereinafter, referred to as "5 G second threshold") necessary for communication in the 5 GHz bandwidth (ST 315: NO), camera 20 finally determines the wireless LAN communication in the 5 GHz bandwidth and transitions to the "standby" state.

On the other hand, in a case where camera 20 fails in the 5 GHz bandwidth wireless LAN connection (ST 314: NO) or the electric field intensity is smaller than the 5 G first threshold or the packet error rate is equal to or higher than the 5 G second threshold (ST 314: YES, ST 315: YES), the flow proceeds to ST 316.

In ST 316, in a case where the bandwidth selected next by camera 20 in ST 308 is the 2.4 GHz bandwidth (ST 316: YES), the flow proceeds to ST 317. In addition, in a case where the next selected bandwidth of camera 20 is the 1.9 GHz bandwidth (ST 316: NO), the flow proceeds to ST 331.

In ST 317, camera 20 activates 2.4 G wireless LAN communication I/F unit 207 so as to enable wireless LAN communication using the 2.4 GHz band.

Then, in a case where the wireless LAN connection in the 2.4 GHz bandwidth is successful (ST 318: YES) and the electric field intensity is equal to or higher than a threshold (hereinafter, referred to as "2.4 G first threshold") necessary for communication in the 2.4 GHz bandwidth and the packet error rate is smaller than a threshold (hereinafter, referred to as "2.4 G second threshold") necessary for communication in the 2.4 GHz bandwidth (ST 319: NO), camera 20 finally determines the wireless LAN communication in the 2.4 GHz bandwidth and transitions to the "standby" state.

On the other hand, in a case where camera 20 fails in the 2.4 GHz bandwidth wireless LAN connection (ST 318: NO) or the electric field intensity is smaller than the 2.4 G first threshold or the packet error rate is equal to or higher than the 2.4 G second threshold (ST 318: YES, ST 319: YES), the flow proceeds to ST 320.

In ST 320, in a case where the bandwidth selected next by camera 20 in ST 308 is the 5 GHz bandwidth (ST 320: YES), the flow proceeds to ST 313. In addition, in a case where the bandwidth selected next by camera 20 is 1.9 GHz bandwidth (ST 320: NO), the flow proceeds to ST 331.

In ST 331, camera 20 activates DECT communication I/F unit 208 so as to enable the DECT communication using the 1.9 GHz band.

Then, in a case where the DECT connection in the 1.9 GHz bandwidth is successful (ST332: YES) and the electric field intensity is equal to or higher than a threshold (hereinafter, referred to as "DECT first threshold") necessary for the DECT communication, and the packet error rate is smaller than a threshold (hereinafter, referred to as "DECT second threshold") necessary for the DECT communication (ST 333: NO), camera 20 finally determines the DECT communication in the 1.9 GHz bandwidth and transitions to the "standby" state.

On the other hand, in a case where camera 20 fails in DECT connection in the 1.9 GHz bandwidth (ST 332: NO) or the electric field intensity is smaller than the DECT first threshold or the packet error rate is equal to or higher than the DECT second threshold (ST 332: YES, ST 333: YES), the flow proceeds to ST 334.

In ST 334, in a case where the bandwidth selected next by camera 20 in ST 308 is the 5 GHz bandwidth (ST 334: YES), the flow proceeds to ST 313. In addition, in a case where the next selected bandwidth of camera 20 is 2.4 GHz bandwidth (ST 334: NO), the flow proceeds to ST 317.

As described above, according to the present exemplary embodiment, it is possible to easily select an optimum communication method based on the environmental values of each bandwidth by measuring the environmental values of the bandwidth of each communication method.

Standby

Figure 9:
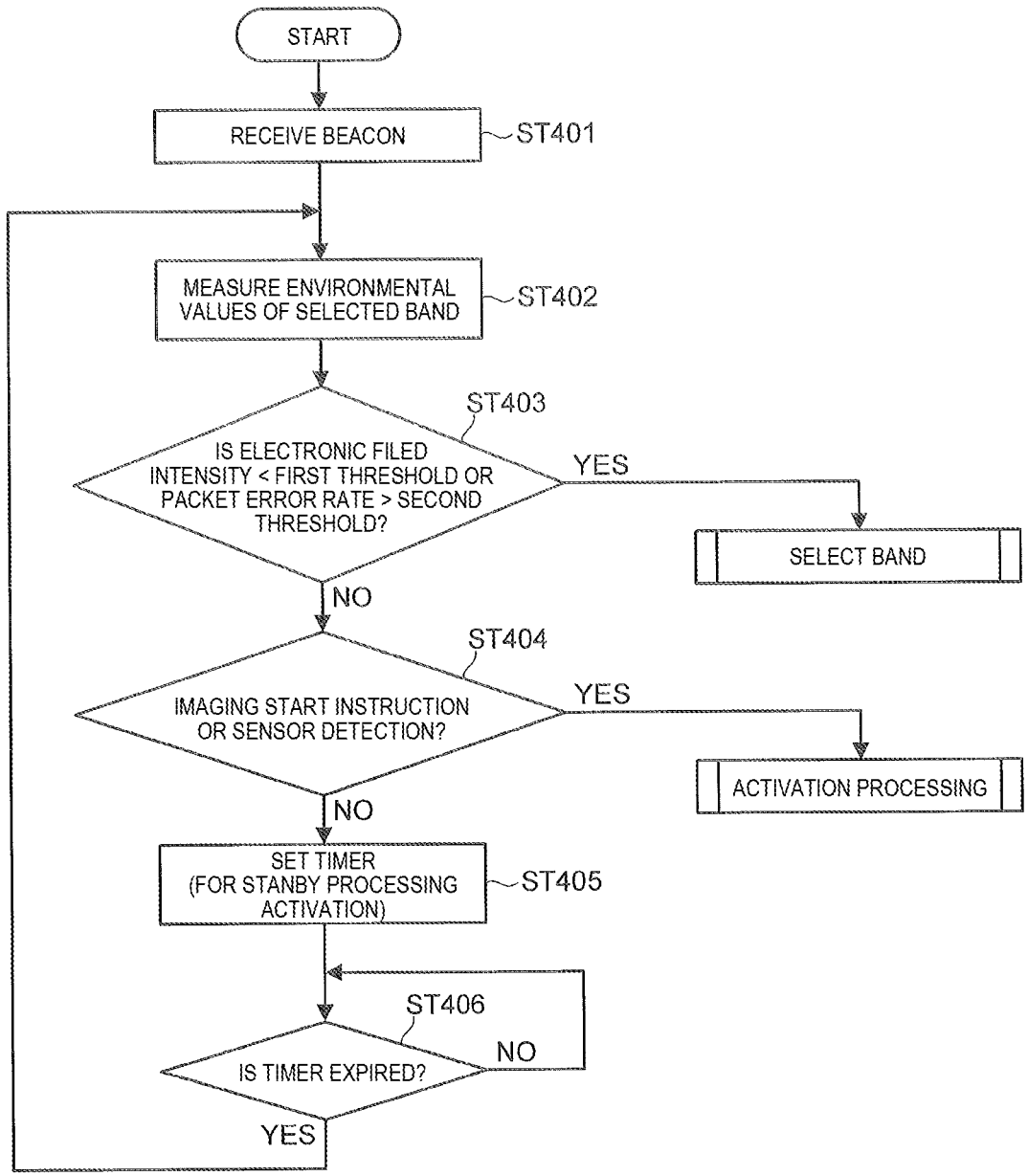
FIG. 9 is a diagram showing a processing flow in a standby state of the camera according to the exemplary embodiment of the present disclosure.

Next, a processing flow in the standby state of camera 20 will be described with reference to FIG. 9.

When receiving a beacon from controller 10 (ST 401), camera 20 measures the environmental values of the selected bandwidth (ST 402).

Then, in a case where the electric field intensity is equal to or higher than the first threshold (5 G first threshold, 2.4 G first threshold, DECT first threshold) necessary for the selected bandwidth and the packet error rate is less than the second threshold (5 G second threshold, 2.4 G second threshold, DECT second threshold) necessary for the selected bandwidth (ST 403: NO), camera 20 performs the determination of ST 404.

On the other hand, in a case where the electric field intensity is smaller than the first threshold or the packet error rate is equal to or higher than the second threshold (ST 403: YES), camera 20 transitions to the "bandwidth selection" state.

In ST 404, in a case where an imaging start instruction is received from controller 10 or a detection signal is input from sensor 201 (ST 404: YES), camera 20 transitions to the "activation processing" state.

On the other hand, in ST 404, in a case where the imaging start instruction is not received from controller 10 and the detection signal is not input from sensor 201 (ST 404: NO), camera 20 sets a timer for starting the standby processing to activate (ST 405).

When the state is maintained until the timer expires (ST 405: NO) and the timer expires (ST 406: YES), the flow returns to ST 402.

Image Transmission

Figure 10:
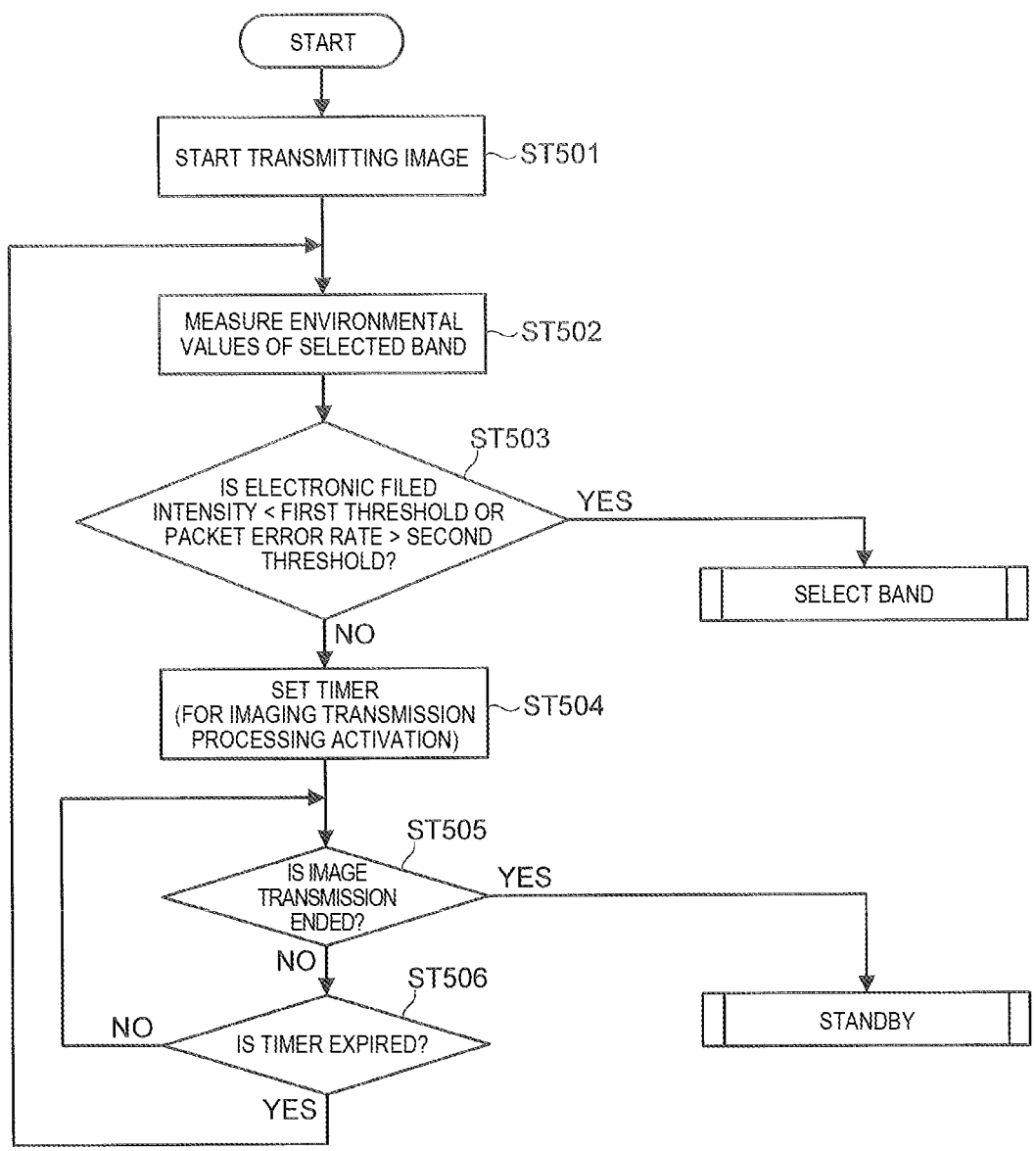
FIG. 10 is a diagram showing a processing flow in a state of image transmission of the camera according to the exemplary embodiment of the present disclosure.

Next, a processing flow in a state of image transmission by camera 20 will be described with reference to FIG. 10.

When camera 20 transitions from the "activation state" to an "image transmission" state, camera 20 starts transmitting the image data to controller 10 according to the selected bandwidth (ST 501).

Thereafter, camera 20 measures environmental values of the selected bandwidth (ST 502).

In a case where the electric field intensity is equal to or higher than the first threshold and the packet error rate is smaller than the second threshold (ST 503: NO), camera 20 sets to activate a timer for starting image transmission processing (ST 504).

On the other hand, in a case where the electric field intensity is smaller than the first threshold or the packet error rate is equal to or higher than the second threshold (ST 503: YES), camera 20 transitions to the "bandwidth selection" state.

After the ST 504, when the image transmission is ended (ST 505: YES), camera 20 transitions to the "standby" state.

When the state is maintained until the timer expires (ST 506: NO) and the timer expires (ST 506: YES), the flow returns to ST 502.

Weight Calculation

Next, a specific example of the weight calculation in ST 307 will be described with reference to FIGS. 11A and 11B. As shown in FIGS. 11A and 11B, for each communication method (wireless LAN and DECT), camera 20 stores a weight table in which weighting coefficients are associated with allocated channels and the peripheral channels thereof, in memory 203.

Control unit 202 calculates the weight sum of each bandwidth by multiplying and adding the weighting coefficient of each channel by the received power of the interference wave for each communication method.

Effects

As described above, according to the present exemplary embodiment, in a relatively simple DECT registration processing, information necessary for wireless LAN communication may be exchanged and wireless LAN setting registration may also be performed. Therefore, the cameras and the controllers that perform wireless communication using any one of a plurality of communication methods having different bandwidths may easily perform setting registration for all communication methods.

In addition, according to the present exemplary embodiment, it is possible to easily select an optimum communication method from a plurality of communication methods having different bandwidths by measuring environmental values of the bandwidth of each communication method and selecting a communication method based on the environmental values of each band.

While various exemplary embodiments have been described with reference to the drawings, it goes without saying that the present disclosure is not limited to such examples. Within the category described in the claims, it will be apparent to those skilled in the art that various changed examples or modification examples may be conceived, and it should be understood that such modifications naturally belong to the technical scope of the present disclosure.

For example, controller 10 of the above exemplary embodiment may be referred to as an access point.

In addition, in the above exemplary embodiment, the case where camera 20 selects a bandwidth in descending order of the weight sum has been described, but the present invention is not limited thereto and a bandwidth may be selected based on other criteria. For example, a bandwidth may be selected in the order of the bandwidths having higher throughput of the communication method from the bandwidths in which the environmental values satisfy a predetermined criterion.

The present invention is suitable for use in a surveillance camera system for monitoring an intruder who has entered a premise in a house.

What is claimed is:

1. A surveillance camera system comprising:
a surveillance camera that performs imaging and generates image data; and
a controller that receives and displays image data from the surveillance camera and controls the surveillance camera,
wherein the surveillance camera and the controller perform wireless communication by any one of a plurality of communication methods having different bandwidths, and
wherein the surveillance camera:
measures a plurality of environmental values indicating an environment of a bandwidth of each of the communication methods,
determines a communication method to be used for communication with the controller based on multiplying each of the environmental values by a weighting coefficient that is associated with a respective one of the communication methods, and
transmits image data to the controller according to the determined communication method.

2. The system of claim 1,
wherein the controller causes the image data to be displayed with a resolution according to a communication method determined by the surveillance camera.

3. The system of claim 1,
wherein the communication methods include a digital enhanced cordless telecommunications (DECT) method and a wireless local area network (LAN) method.

4. A registration method of a surveillance camera system including a surveillance camera that performs imaging and generates image data and a controller that receives and displays image data from the surveillance camera and controls the surveillance camera, the method comprising:
causing the surveillance camera and the controller to perform wireless communication by any one of a plurality of communication methods having different bandwidths; and
causing the surveillance camera to:
measure a plurality of environmental values indicating an environment of a bandwidth of each of the communication methods,
determine a communication method to be used for communication with the controller based on multiplying each of the environmental values by a weighting coefficient that is associated with a respective one of the communication methods, and
transmit image data to the controller according to the determined communication method.

5. The method of claim 4, further comprising:
causing the controller to display the image data with a resolution according to a communication method determined by the surveillance camera.

6. The system of claim 4,
wherein the communication methods includes a digital enhanced cordless telecommunications (DECT) method and a wireless local area network (LAN) method.

* * * * *